(12) United States Patent
Antoune et al.

(10) Patent No.: US 6,974,307 B2
(45) Date of Patent: Dec. 13, 2005

(54) SELF-GUIDING WIND TURBINE

(75) Inventors: Ivan Lahuerta Antoune, Poligano Malpica C/E n 29, Nave 9, E-50016 Zaragoza (ES); Sebastian Manuel Lahuerta Antoune, Saragossa (ES); Maria Lahuerta Antoune, Saragossa (ES)

(73) Assignee: Ivan Lahuerta Antoune, (ES)

( * ) Notice: Subject to any disclaimer, the term of this patent is extended or adjusted under 35 U.S.C. 154(b) by 0 days.

(21) Appl. No.: 10/733,429

(22) Filed: Dec. 11, 2003

(65) Prior Publication Data

US 2004/0120801 A1   Jun. 24, 2004

Related U.S. Application Data

(63) Continuation of application No. PCT/ES02/00303, filed on Jun. 11, 2002.

(30) Foreign Application Priority Data

Jun. 12, 2001   (ES) ................................ 200101404

(51) Int. Cl.[7] .............................................. F03D 5/00
(52) U.S. Cl. ................. 416/9; 416/16; 416/132 B; 416/145; 416/149; 416/150
(58) Field of Search .................... 416/9, 11, 16, 18, 416/132 B, 139, 144, 145, 149, 150

(56) References Cited

U.S. PATENT DOCUMENTS 4,242,043 A    12/1980  Poulsen
4,449,889 A    5/1984   Belden
4,533,297 A    8/1985   Bassett
4,630,996 A    12/1986  Masaki
5,295,793 A *  3/1994   Belden ........................ 416/13

FOREIGN PATENT DOCUMENTS

| DE | 29 16 878 | 11/1980 |
|---|---|---|
| DE | 40 29 932 A1 | 3/1992 |
| ES | 2 065 803 | 2/1995 |
| WO | WO 00/36299 | 6/2000 |

* cited by examiner

Primary Examiner—Edward K. Look
Assistant Examiner—Dwayne White
(74) Attorney, Agent, or Firm—St. Onge Steward Johnston & Reens LLC

(57) ABSTRACT

A self-guiding wind turbine made of two reinforced parallel girders whose side center of thrust is displaced from the column axis where it is supported and turns. Its dihedral-shaped two-bladed rotor is self-stabilizing since its center of thrust is behind its center of gravity and the guiding axis of the turbine, thus improving self-guiding whilst in motion. The axial thrust is controlled, whilst the head and rotor are tilting, hydraulically by counter-pressure, ensuring they do not surpass the power collected and the moments on the structure, shoe and ground. The self-guiding structure can tilt hydraulically lowering its head and rotor and facilitating its assembly and maintenance, and can remain "asleep" when not in use, thus reducing the visual impact on the environment. This turbine makes use of the force of the wind to control itself, simplifying the manufacture of large turbines connected to the network or in isolated applications.

18 Claims, 8 Drawing Sheets

LEEWARD

WINDWARD ical Patent Application No. PCT/ES02/00303 filed Jun. 11, 2002 which designates the United States and claims priority of pending Spanish Application No. P200101404 filed Jun. 12, 2001.

SELF-GUIDING WIND TURBINE

This application is a continuation of pending International Patent Application No. PCT/ES02/00303 filed Jun. 11, 2002 which designates the United States and claims priority of pending Spanish Application No. P200101404 filed Jun. 12, 2001.

FIELD OF THE INVENTION

The present invention refers to a novel design for a self-guiding wind turbine, in which an attempt is made to simplify the execution of this type of machine, equipping it with a greater degree of freedom, giving it self-guiding structures and self-stabilizing rotors, where the force of the wind itself is used to protect them instead of destroying them, given that they are already working "for the air current," better using said force and ensuring that the structure, shoe or ground can withstand forces greater than the nominal. The attribute that the structure can tilt, even to the point where the head and rotor are very near the ground, reduces the time and cost of assembly and maintenance, as well as the necessary infrastructure, and is thus a highly competitive and profitable product applied to the manufacture of aero-generators connected to a network and/or in those cases where wind energy is to be used for pumping, saving energy and in isolated cases of the network.

BACKGROUND OF THE INVENTION

The majority of world wind farms use three-bladed horizontal-axis aero-generators. Nevertheless, there is a large number of low-power air-pumps and aero-generators that make up a very small part (of little importance) of total installations.

As for the general size, there are different levels of technological maturity. The dimensions of aero-generators have been increasing, gradually increasing from 75 kW, 15 m-diameter aero-generators to 40–65 m diameter and 500–1500 nominal kW machines, all with three blades to windward and a tubular tower to leeward. During the development of the technology there have been no major innovations. The process has consisted of optimizing and improving designs and manufacturing processes, resulting in an improvement in the availability of the aero-generator, in production yield, in a reduction in specific weights (Specific Weight [Weight=rotor+gondola]/rotor swept area), in a reduction in installation, operation and maintenance costs but always keeping the same structural parameters (Height of tower=¾ diameter of rotor+10 in meters).

To be more specific, the current systems are:
Three-bladed aero-generators with regulation for aerodynamic loss with two-speed rotation via the normal system of connecting poles in asynchronous generators.
Three-bladed aero-generators with regulation for aerodynamic loss with fixed-speed asynchronous generators.
Three-bladed aero-generators with regulation for change of wind, combined with a small-range variable speed system (Opti-slip).
Regulation systems for change of wind at fixed speeds.
Three-bladed aero-generators with no multiplication box through multi-poled synchronous generators, regulated for change of wind and variable speed system.

The aero-generator is generally three-bladed with a tubular tower to leeward, regulated for loss and/or change of wind and an active orientation system. The rotor activates a multiplier, which in turn activates the generator; a brake disc is placed on the exit axis of the multiplier.

Despite the confirmed good functioning in generating and using wind, structurally there are various problems due to the shadow of the towers on the blades, the gyroscopic moments created because the center of gravity of the rotor is displaced with respect to the rotation axis, specific weights in the order of 14 $kg/m^2$ and the pitching moments due to constant changes in wind direction and differences in speed between the upper and lower blades, which have an effect on the whole structure, weakening it when endowed with rigid rotors, as well as the inconvenience of assembly and maintenance at high altitudes.

It is important to highlight the increase in specific weight in large aero-generators. If we compare values of aero-generators of 45 m in diameter (600 kW of nominal power) and 60 m in diameter (1 MW of nominal power), there is an increase of more than 30%, which has an effect on the specific cost (total cost/area swept) as well as a 35% increase in the costs of the installed kW. Below we will describe some of the basic components:

Rotor: The rotor generally has three blades, with a bushing that is fixed to the axis that is embedded on two bearings fastened tightly to the gondola chassis, or is placed directly onto the multiplier entrance axis. The rotors used are usually slow rotors with speeds at the end of the blades of 55 m/s, their rotation level being five meters from the column of the axis they pivot on, and produce gyroscopic effects that tend to destabilize the machine. In most cases, the rotor is situated windward of the tower (front wind). This has the advantage of reducing wind stress on the blades by minimizing the shadow effect of the tower and avoiding the aerodynamic noise produced by the blades when they are situated to leeward. Three-bladed aero-generators currently account for 80% of total installations. Nevertheless, as rotor diameter increases, so does the number of two-bladed aero-generators, which are usually designed to be used to leeward and where the shadow effect of the tower on the blades is more noticeable, thus producing significant stresses and vibrations.

Guiding: Most aero-generators use a guiding system using a servomotor that activates the cogs that work on the perforated crown of the gondola coupling with the support tower. This system also has brake discs and pincers that keep it in place when it is positioned. This produces gyroscopic moments and pitching moments due to the constant changes in wind direction, which act through the rotor on the multiplier and the overall structure.

Power control: The power generated is controlled in two ways, due to aerodynamic loss and due to wind change. The latter allows maximum generation in a large range of wind speeds, also having a safety system against high winds (blades in the air), whereas the former needs additional breaking provisions. Wind change controls are equipped with complex moving parts and the corresponding risk of failure and greater maintenance needs.

Tower: As far as the structure of the tower is concerned, the majority are steel vertical, tubular and independent. To optimize the structure, a barrel shape is adopted, the diameter gradually decreasing between the base and the gondola. The height of towers is inconvenient when it comes to assembling and maintaining them. Moreover, the fact that the generator is situated on the gondola, which revolves, results in the problem of how to transmit power to the ground through cables. Until now, most manufacturers have made a loop with the cables to minimize the effect of the coiling resulting from the changes in guiding, which in turn requires a computer operated control system that counts the number of rotations accumulated and orders the gondola to rotate in the opposite direction to uncoil the cables. Even though there has been some gradual technological development in relation to power lines, variable pitch and speed, control systems, material and in other areas, too, perhaps the best results have been obtained with large-scale machines. Specific energy (kWh/m$^2$) increases with the rotor diameter thanks to the increased height of the tower, which is synonymous, in most cases, with increased wind speed. However, increased wind speed may not compensate the increase in manufacturing costs if, keeping current technical design concepts, attempts are made to design machines with diameters larger than the rotor's 50 m. This is due to the fact that the main pressure on aero-generators depends on the cube of the rotor diameter, the weight and manufacturing costs increasing in the same manner, while the increase in energy produced increases with the area of the rotor. On the other hand, specific costs of transportation, assembly, operating and maintenance of these high-power machines are greater than those of aero-generators currently on the market. Making larger competitive machines depends on the development of novel and suitable designs, with the result that there is no significant increase in their specific weight.

SUMMARY OF THE INVENTION

In accordance with an embodiment of the invention, a wind turbine, having a self-guiding windward design, includes a boomerang-shaped structure, balanced at a bottom end thereof by a usable platform serving as a counterweight and at an upper end thereof by a rotor head, the rotor head being located in such a way that a center of gravity of a rotor is on a vertical axis of a column on which the structure pivots, thus eliminating gyroscopic effects. When the rotor and the rotor head are required to tilt due to axial thrust, the rotor and the rotor head tilt, while the structure remains stationary.

In some embodiments, the wind turbine is characterized in that the rotor comprises a self-stabilizing two-bladed rotor which improves self-guiding of the wind turbine whilst in action due to the fact that the rotor is in a shape of a dihedral having an axial center of thrust situated behind, seen in a direction of incidental wind, a center of gravity of the rotor, giving the rotor independent stability. In accordance with this embodiment, the wind turbine is also characterized in that an application point of axial thrust is situated behind, seen in the direction of the incidental wind, a rotation axis of the column on which the structure pivots so as to improve self-guiding of the wind turbine whilst the wind turbine is in action. In accordance with this embodiment, the wind turbine is further characterized in that the two-bladed rotor is supported by a fork-bolt assembly situated on an axis that goes through the rotor's center of gravity, allowing the rotor to oscillate, and minimizing, due to a shock absorber, pitching moments generated by the incidental wind in low attack angles and continuous direction changes and at different speeds between upper and lower blades of the rotor. The wind turbine is further characterized in that the two-bladed rotor is configurable to have a w-shape when it is required that the center of gravity remain within the two-bladed rotor.

In some embodiments, the wind turbine is characterized in that internal elements of a multiplier do not support axial thrust, pitching moments, or vibrations from the rotor, since the fork-bolt assembly responsible for transmitting motor pair, the axial thrust, the pitching moments and the vibrations from the rotor is fixed on a movable hoop of a large bearing, the fixed hoop of the bearing being linked externally to a clamp which fastens a chassis of the multiplier, which is an epicycloidal multiplier, so that the axial thrust, the pitching moments and the vibrations are transmitted from the fork-bolt assembly to the chassis of the multiplier without passing through a primary axis of the multiplier, whereby durability of axes, bearings and cogs of the multiplier is enhanced.

In some embodiments, the wind turbine is characterized in that a generator, a pump, a compressor or an element to be activated is assembled on a fixed hoop of a second bearing situated concentrically on a head of the column on which the structure pivots, thereby eliminating rotating links transmitting power. In accordance with this embodiment, the wind turbine is also characterized in that the wind turbine has on a movable hoop of the bearing, joined to the structure, a fixed or variable cylindered petrohydraulic servomotor for sending power to an axle of the generator, the pump, the compressor or the element to be activated. The wind turbine is further characterized in that a petrohydraulic plant situated on the rotor head transforms mechanical energy of the rotor into petrohydraulic energy, transmitting the petrohydraulic energy through pressure pipes to the servomotor, thus forming a closed circuit.

In accordance with another embodiment of the present invention, a wind turbine includes a support structure having a first end and a second end, the support structure being pivotally mounted, between the first end and the second end, to a column, the column having a substantially vertical axis. A counterweight is located adjacent the first end of the support structure, and a rotor head is attached adjacent the second end of the support structure, the rotor head having a rotor with a center of gravity located on the substantially vertical axis of the column so as to reduce gyroscopic effects.

In some embodiments, the rotor head is tiltably attached to the second end of the support structure such that when the rotor head and the rotor and are required to tilt due to axial thrust, the rotor head tilts about the support structure, while the support structure remains stationary. In some embodiments, the support structure has an L-shaped configuration. In some embodiments, the counterweight comprises a useable platform.

In some embodiments, the rotor comprises a self-stabilizing two-bladed rotor so as to improve self-guiding of the wind turbine whilst in action. In certain of these embodiments, the rotor is configured as a dihedral having an axial center of thrust situated behind, viewed in a direction of incidental wind, a center of gravity of the rotor, so as to give the rotor independent stability. In certain embodiments, an application point of axial thrust is situated behind, viewed in a direction of incidental wind, a rotation axis of the column so as to improve self-guiding of the wind turbine whilst the wind turbine is in action.

In some embodiments, the wind turbine further includes a fork-bolt assembly supporting the rotor, the fork-bolt assembly being situated on an axis passing through the rotor's center of gravity, so as to allow the rotor to oscillate. In certain of these embodiments, the fork-bolt assembly includes a shock absorber for reducing pitching moments generated by the incidental wind when the incidental wind has low attack angles, when the incidental wind exhibits continuous direction changes or when the incidental wind encounters upper and lower blades of the rotor at different speeds. In certain embodiments, the rotor has a w-shape.

In some embodiments, the wind turbine further includes a multiplier having internal elements and a chassis. In these embodiments, axial thrust, pitching moments, and vibrations created by the rotor are transmitted through the fork-bolt assembly to the chassis of the multiplier such that the axial thrust, pitching moments, and vibrations are not transmitted through the internal components of the multiplier so as reduce wear of the internal components of the multiplier. In certain of these embodiments, the wind turbine further includes a bearing rotatably attaching the fork-bolt assembly to the chassis of the multiplier.

In some embodiments, the column comprises a rotatable portion to which the support structure is pivotally mounted and a stationary portion, and the wind turbine further includes a petrohydraulic plant situated on the rotor head which converts mechanical energy of the rotor into petrohydraulic energy, a petrohydraulic servomotor attached to the rotatable portion of the column, pressure pipes connecting the petrohydraulic plant with the servomotor, thus forming a closed circuit by which the petrohydraulic energy is transmitted from the petrohydraulic plant to the petrohydraulic servomotor, and an element to be activated attached to the stationary portion of the column. In these embodiments, the petrohydraulic servomotor converts the petrohydraulic energy into mechanical energy, the mechanical energy being transmitted from the petrohydraulic servomotor to the element to be activated, thereby eliminating rotating links for transmitting power. In certain of these embodiments, the wind turbine further includes a bearing rotatably connecting the rotatable portion of the column and the fixed portion of the column. In certain embodiments, the element to be activated comprises a generator, a pump or a compressor.

BRIEF DESCRIPTION OF THE DRAWINGS

FIG. 3 shows the profile and plan of the head and rotor on the upper part of the self-guiding structure, where it can be seen that the ground plan is made up of two reinforced parallel girders positioned on the edge, which the whole tilts on;

DETAILED DESCRIPTION OF AN EMBODIMENT OF THE INVENTION

Figure 1:
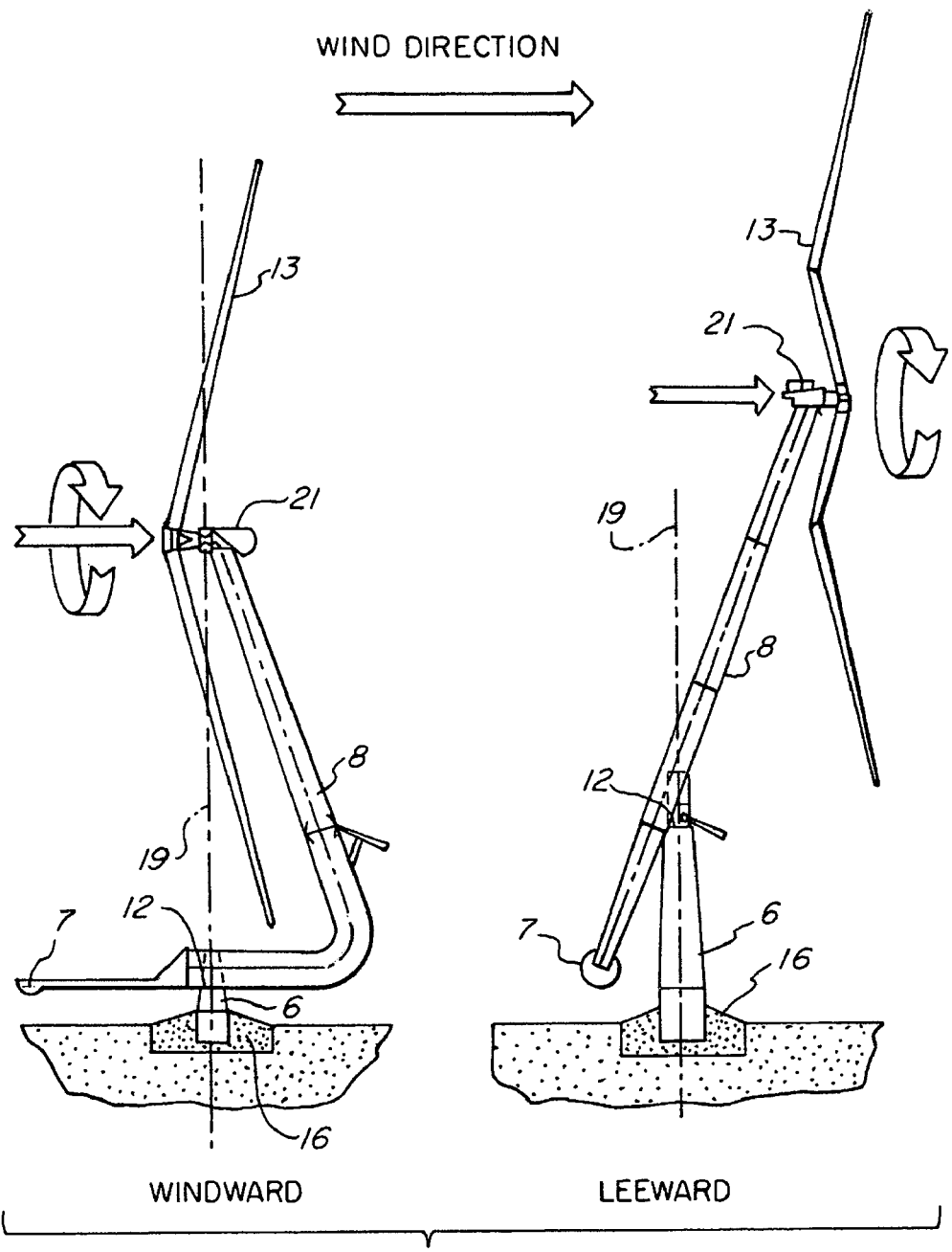
FIG. 1 shows drawings of wind turbines windward and leeward, seen in profile, the scale corresponding to 1 MW to 11 m/s machines.

Referring to FIGS. 1–8, in the present invention, we are attempting to use wind energy with simpler turbines than the classical turbines currently on the market, putting forward a self-guiding design that confers complete freedom when it comes to positioning itself in the direction of the wind, taking better advantage of the incidental current energy, whose force is used not only to capture power but also to protect it, avoiding the necessity to overcome forces and moments superior to those calculated. The design of said self-guiding structure, formed of two reinforced parallel girders positioned on their side in the form of a "grating", has a section protruding less in the head-on direction of the wind (machine in position), allowing the wind to pass through, encountering less resistance and simultaneously reducing the shadow effect on the blade and making it self-guiding given that its center of thrust is moved sideways with respect to the rotation axis of the column it is supported by.

In the windward execution, the "boomerang" structure allows us to distance it from the rotation plane of the blades, which maintain a dihedral form, and situates the rotor's center of gravity in the vertical of the column's axis, thus eliminating gyroscopic effects (precession) that normally destabilize the rotor. The leeward execution, with the conic form of the rotor and the slant of the self-guiding structure, make them differ, thus eliminating the shadow effect of the structure on the blade. These two designs give us two machines, one with a low rotor (windward) and the other with a high rotor (leeward), depending on which one is desired at any given time. As for the specific weights (weight of rotor+gondola/area swept), the present invention reduces them significantly, going from 14 Kg/m$^2$ to 4.5 Kg/m$^2$ and thus:

a) There are two blades instead of three, lighter in weight being made of an aluminum barrel-shaped core, 2.65 Kg/dm$^3$ thick, the aerodynamic aluminum ribs lie on, ribs with a 1.2 mm sheet of polycarbonate 1.2 Kg/dm$^3$ thick finishing the ribs and thus forming an aerodynamic blade. Its center of gravity is 39% of the way along from the fastening clamp.

b) Given that the rotor is the shape of a dihedral and the support forces compensate the forces of the centrifugal action, there is a resulting dominant traction stress, borne by the whole elliptical section formed by the blade core, thus allowing the design of rapid rotors with tangential speeds on the order of 75 m/s instead of the 55 m/s of traditional blades, which reduces the multiplier's entry pairs, as well as the level of multiplication, thus resulting in multipliers weighing 2.2 Tm instead of 7.6 Tm for 1 Mw machines, with rotor diameters of 60 m to 11 m/s of wind speed. In this case, the blades forming the dihedral are at a 12° to 14° angle to the vertical, the axial center of thrust application being 70% along the bisector of the dihedral, a long way behind its center of gravity, thus making it independently stable.

c) The use of generators with four poles (1,500 rpm) and half tension, 6 KV, reduces their weight and eliminates the transformers at the base of the machine and also reduces the number of cables transmitting electric energy. When the generator is situated in the axis of the column (FIG. 5, reference numeral 9) (fixed at its upper end instead of being on the head), in order to avoid the use of rotating links for transmitting power, the power collected by the rotor is transmitted by a petrohydraulic circuit (FIG. 5, reference numeral 15), whose plant and pumps are located in the rotor head, thus reducing its specific weight, given that it has high pressure hydraulic pumps (350 Kg/m$^2$), a weight/power equation in the order of 0.4 kg/kW instead of 5.5 kg/kW with electric generators. The rotating links in high-powered machines are expensive and complex.

The alternative to using a hydrostatic transmission made up of a fixed rolled pump (FIG. 4, reference numeral 2) and a rolled variable servomotor (FIG. 5, reference numeral 14) linked by their corresponding hydraulic conduits allows us to activate fixed-speed generators with variable-speed rotors designed at constant (Lambda), thus improving the yield at any speed, and allows the use of synchronous generators that will provide better-quality energy to the network. If the generator is situated on the fixed loop of the bearing, concentric and fixed to the column, and the servomotor that activates it is situated concentrically above the mobile hoop the self-guiding structure rests on, we have a great competitive edge because we can make self-guiding aero-generators with a low specific weight providing high-quality electricity.

As we have explained in the state of the art, the various makers concentrate on controlling the power collected, making sure not to go over the rotor's entry pair. In our invention the thrust axis is controlled, the axis being the real generating force of all the dynamic moments on the machine, shoe and ground. The axial thrust (FIG. 2) is born of the different dynamic pressures between the front and back faces of the rotor, this thrust being the real motor that the rotor transforms into mechanical power. Therefore, with the axial thrust controlled, we not only control the power collected by the turbine, but we also guarantee that the structure, shoe and ground do not surpass the foreseen stresses. As a consequence, we reduce the spread of civil architecture and build lighter machines. By reducing the specific weights with lighter rotors and heads, we can make tilting structures that can be assembled and maintained nearer the ground, thus making wind farms more profitable. Locations with average wind speeds of 5.4 m/s can be exploited with larger markets.

Figure 2:
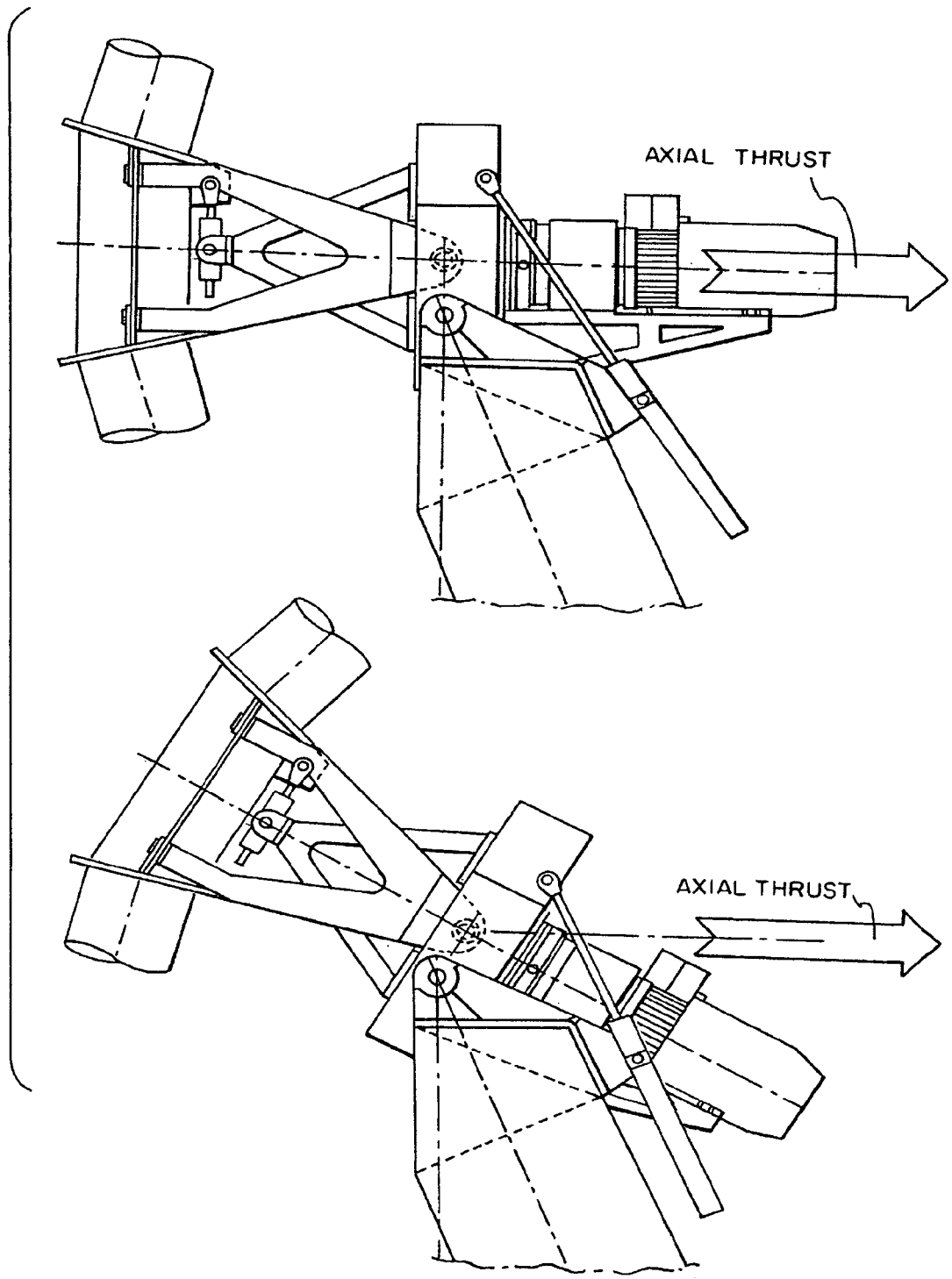
FIG. 2 shows the tilting of the head and rotor due to the axial thrust, as opposed to the hydraulic cylinders, for the windward version.

Referring now to specific Figures, in FIGS. 1 and 2, reference numeral 6 indicates a column, reference numeral 7 indicates a counterweight, reference numeral 8 indicates a self-guiding structure, reference numeral 12 indicates a bearing, reference numeral 13 indicates a rotor, reference numeral 16 indicates a shoe, reference numeral 19 indicates a pivot axis, and reference numeral 21 indicates a rotor head.

Figure 3:
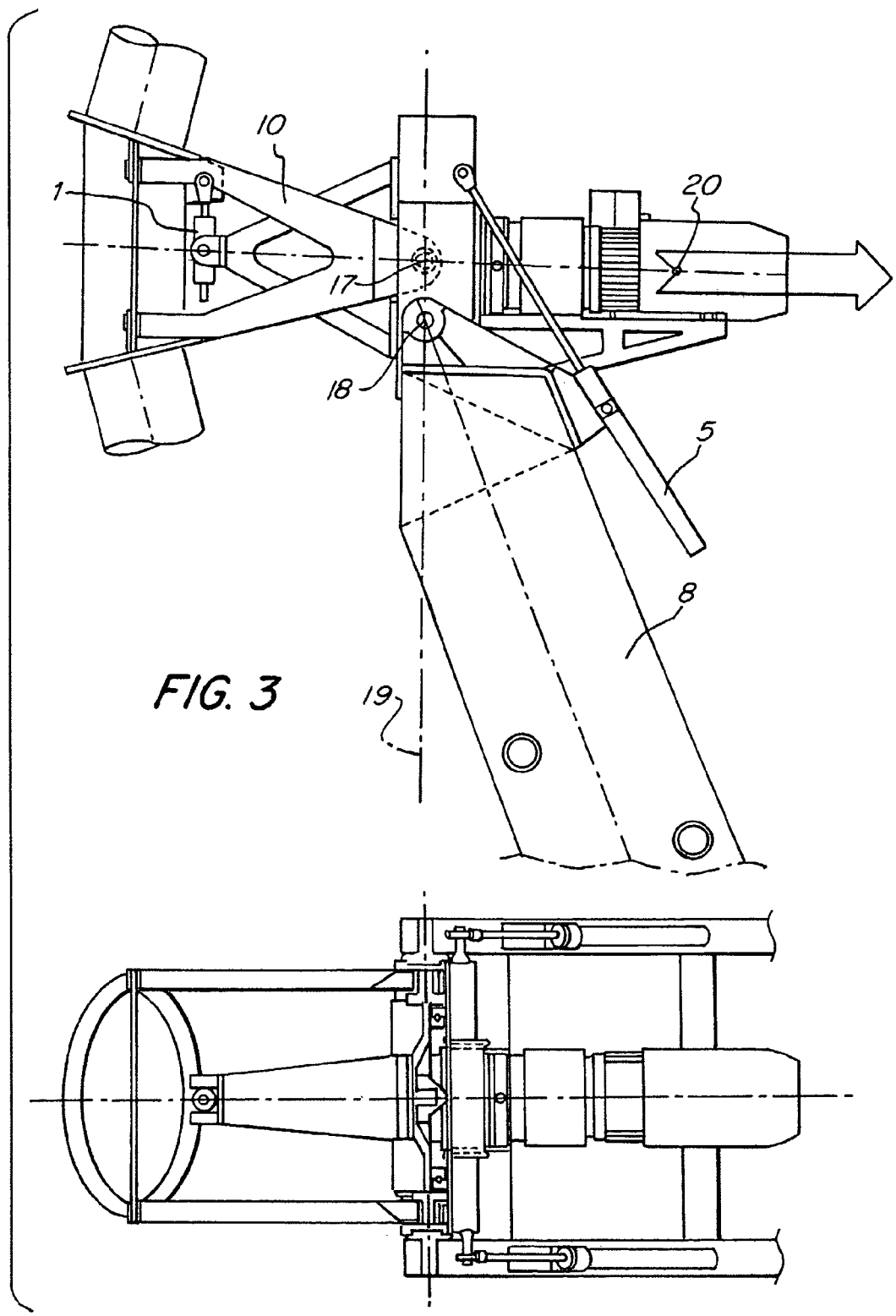

In FIG. 3, reference numeral 1 indicates a shock absorber, reference numeral 5 indicates a hydraulic cylinder, reference numeral 8 indicates a self-guiding structure, reference numeral 18 indicates a tilting axis, reference numeral 19 indicates a pivot axis, and reference numeral 20 indicates an axial thrust application point.

Figure 4:
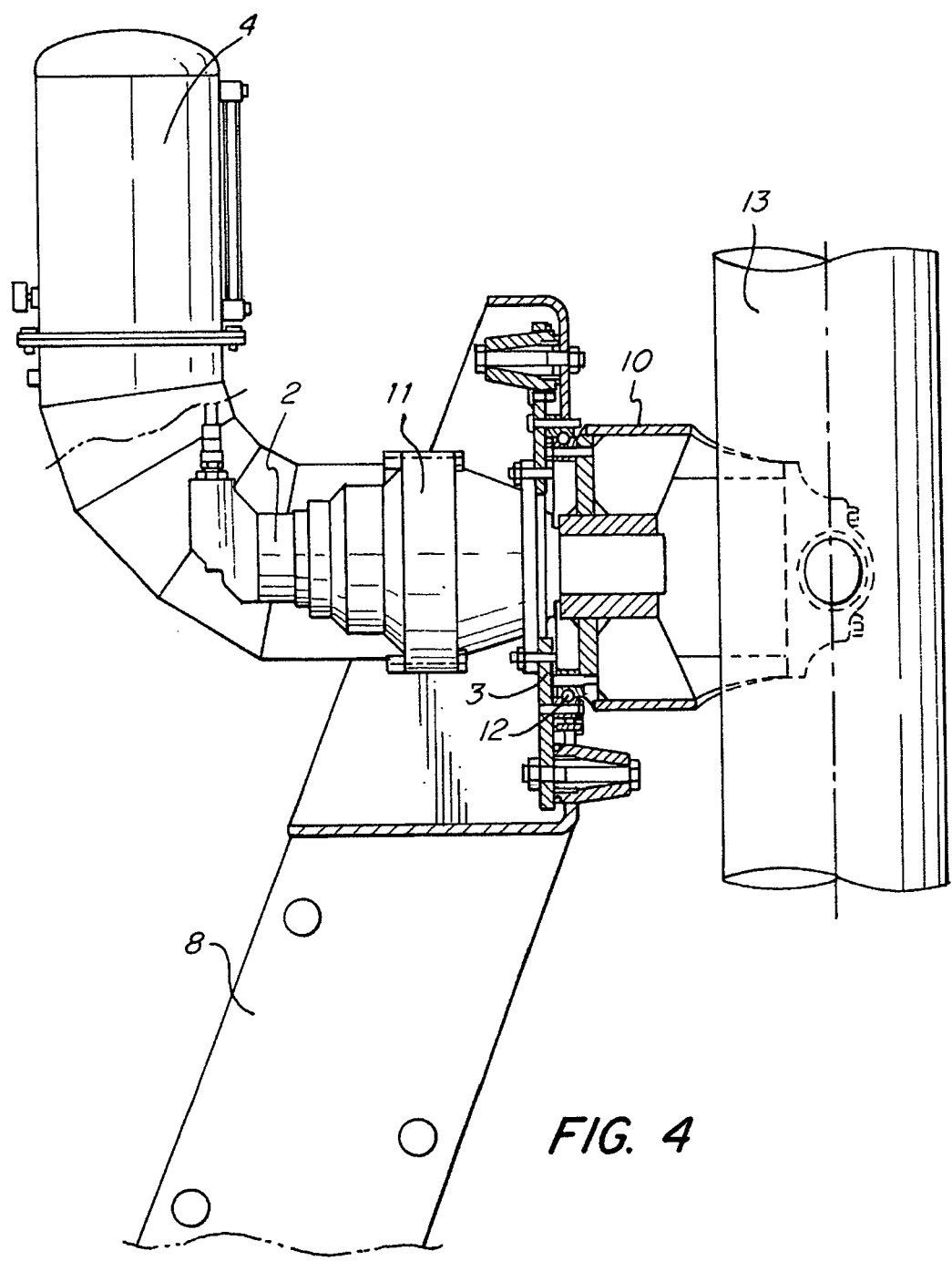
FIG. 4 represents the rotor head, showing the assembly of the rotor fork through the joint bearing with the epicycloidal multiplier chassis.

In FIG. 4, reference numeral 2 indicates a hydraulic pump, reference numeral 3 indicates a fastening clamp, reference numeral 4 indicates a hydraulic plant, reference numeral 8 indicates a self-guiding structure, reference numeral 10 indicates a fork, reference numeral 12 indicates a bearing, and reference numeral 13 indicates an oscillation rotor.

Figure 5:
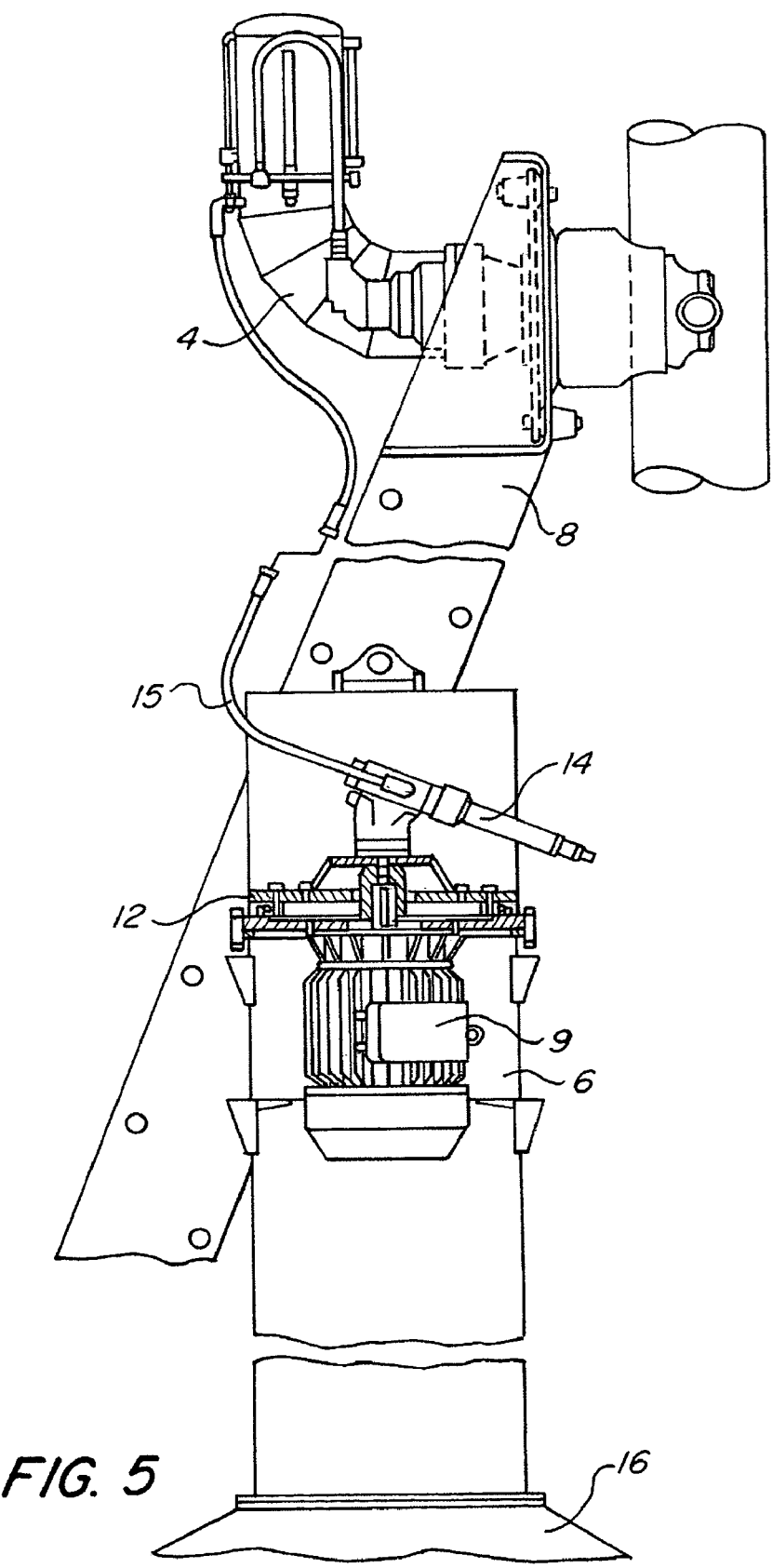
FIG. 5 shows the assembly of the generator on a fixed hoop of the bearing situated at the upper end of the column it pivots on, having, on the movable hoop, a servomotor that activates the generator through hydrostatic transmission, from the hydraulic plant situated on the rotor head on the upper end of the self-guiding structure.
Figure 6:
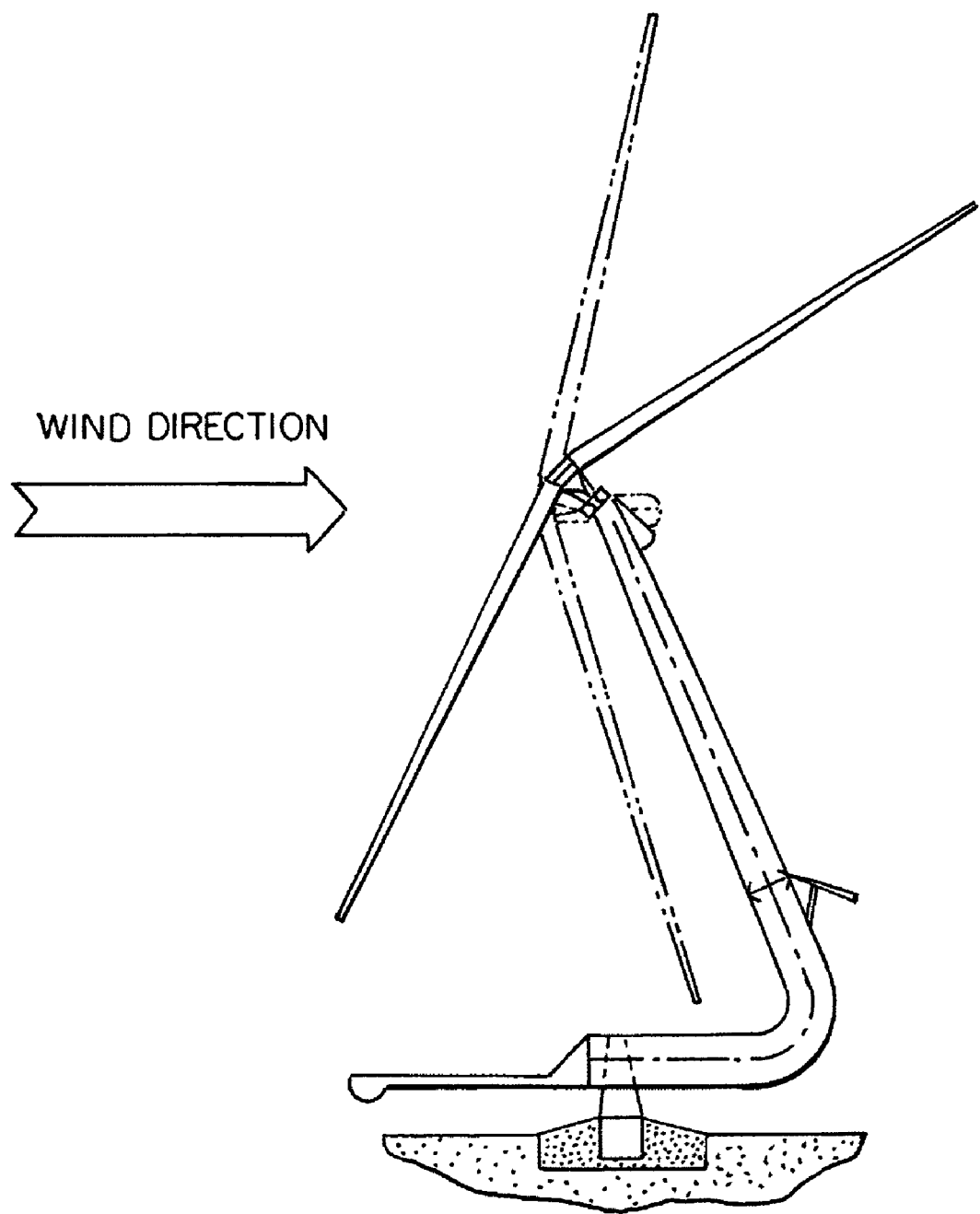
FIG. 6 shows the self-guiding windward wind turbine in a "boomerang" shape with the rotor head in a semi-tilted position.
Figure 7:
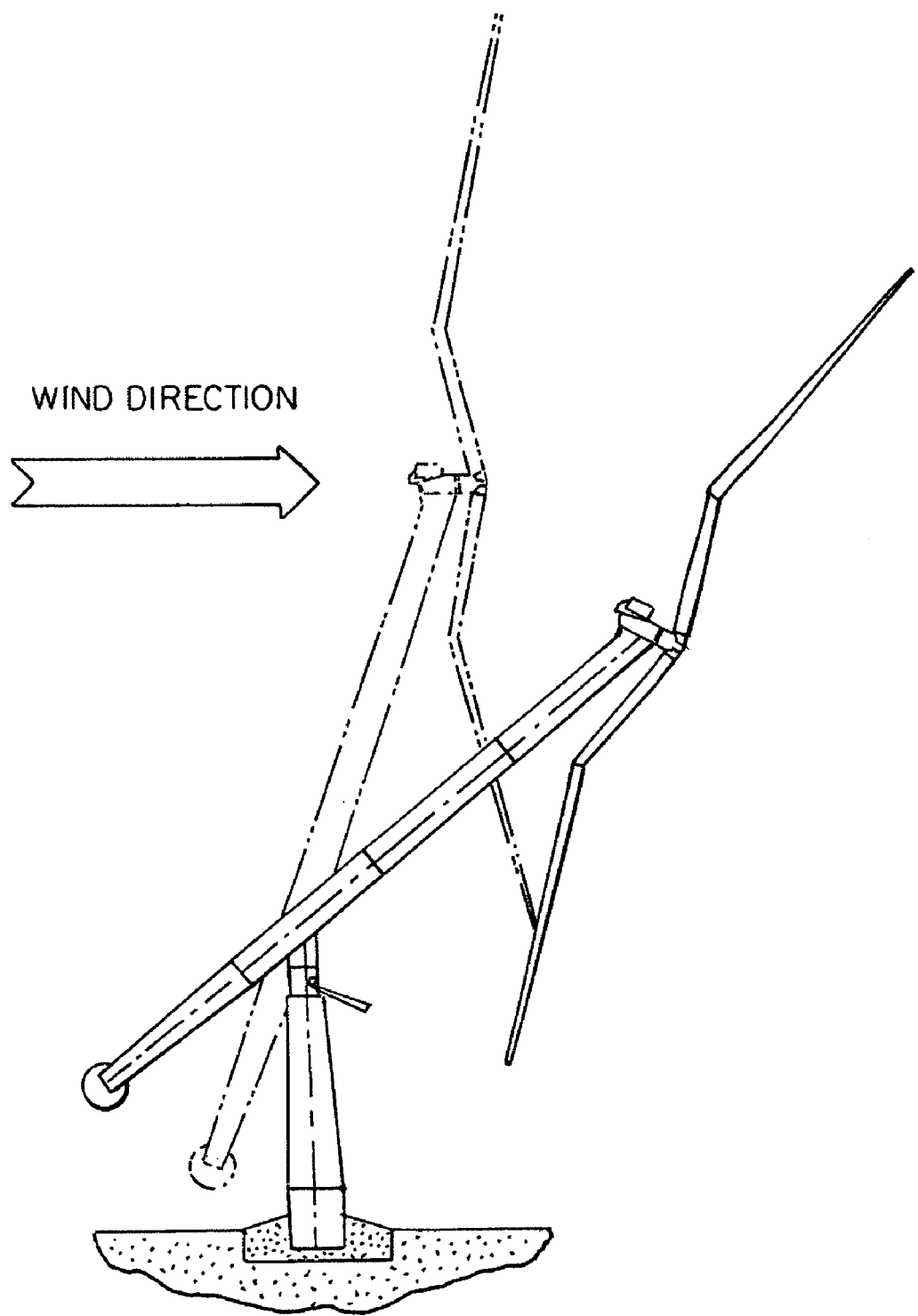
FIG. 7 shows the self-guiding leeward wind turbine in a semi-tilted position.
Figure 8:
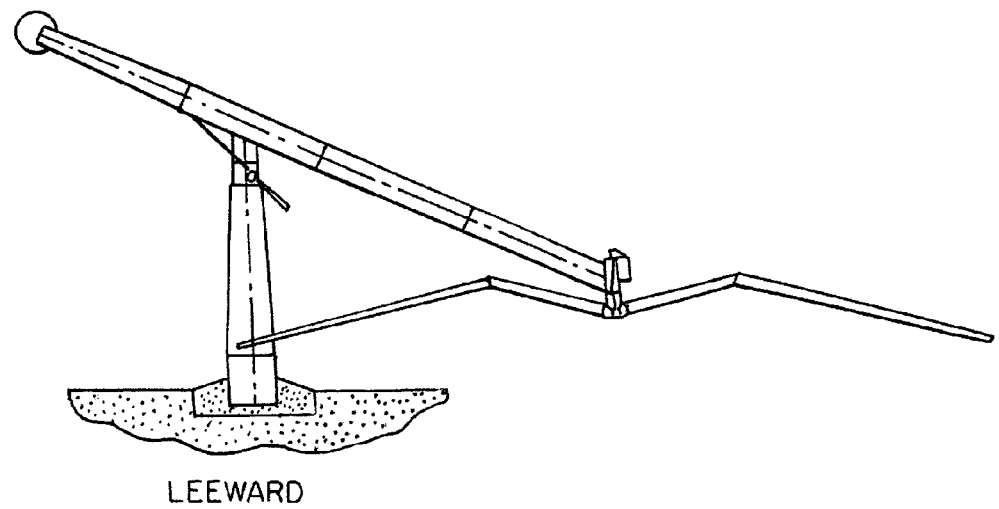
FIG. 8 shows both designs, completely tilted, in maintenance position.
Figure 8:
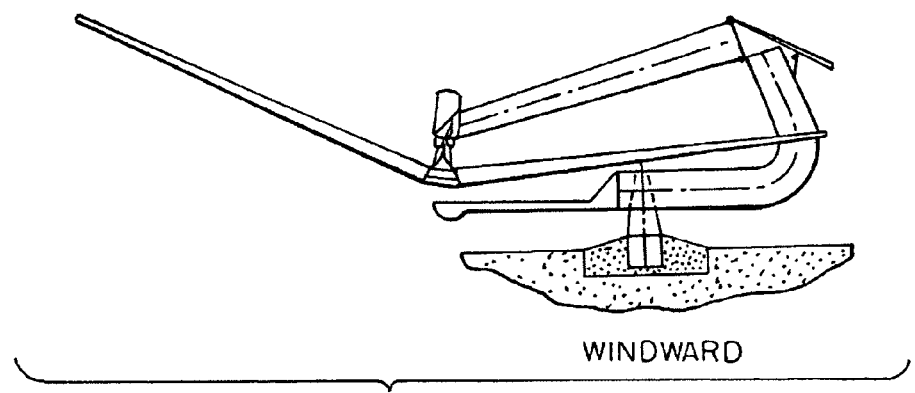

In FIG. 5, reference numeral 4 indicates a hydraulic plant, reference numeral 6 indicates a column, reference numeral 8 indicates a self-guiding structure, reference numeral 9 indicates a generator, reference numeral 12 indicates a bearing, reference numeral 14 indicates a hydraulic servomotor, reference numeral 15 indicates a hydrostatic transmission, and reference numeral 16 indicates a shoe.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A wind turbine, having a self-guiding windward design, the wind turbine comprising:
   a boomerang-shaped structure;
   a column on which the structure pivots;
   a usable platform serving as a counterweight disposed at a bottom end of the structure;
   a rotor head disposed at an upper end of the structure, the rotor head having a rotor and being located in such a way that a center of gravity of the rotor is on a vertical axis of the column, thus eliminating gyroscopic effects; and
   wherein when the rotor and the rotor head are required to tilt due to axial thrust, the rotor and the rotor head tilt, while the structure remains stationary.

2. The wind turbine in accordance with claim 1, characterized in that the rotor comprises:
   a self-stabilizing two-bladed rotor having a dihedral shape with an axial center of thrust situated behind, seen in a direction of incidental wind, a center of gravity of the rotor, thereby giving the rotor independent stability and improving self-guiding of the wind turbine whilst in action;
   wherein an application point of axial thrust is situated behind, seen in the direction of the incidental wind, a rotation axis of the column on which the structure pivots so as to improve self-guiding of the wind turbine whilst the wind turbine is in action;
   a fork-bolt assembly supporting the two bladed rotor, which fork-bolt assembly is situated on an axis that goes through the rotor's center of gravity, allowing the rotor to oscillate, and minimizing, due to a shock absorber, pitching moments generated by incidental wind in low attack angles and continuous direction changes and at different speeds between upper and lower blades of the rotor; and
   wherein the two-bladed rotor is configurable to have a w-shape when it is required that the center of gravity remain within the two-bladed rotor.

3. The wind turbine in accordance with claim 2, further comprising:
   an epicycloidal multiplier having a chassis and internal components;
   a large bearing having a moveable hoop upon which the fork-bolt assembly responsible for transmitting motor pair, the axial thrust, the pitching moments and the vibrations from the rotor is fixed, such that the internal elements of the multiplier do not support axial thrust, pitching moments, or vibrations from the rotor; and
   wherein the fixed hoop of the bearing is linked externally to a clamp which fastens the chassis of the multiplier so that the axial thrust, the pitching moments and the vibrations are transmitted from the fork-bolt assembly to the chassis of the multiplier without passing through a primary axis of the multiplier, whereby durability of axes, bearings and cogs of the multiplier is enhanced.

4. The wind turbine in accordance with claim 3, further comprising:
   a second bearing situated concentrically on a head of the column on which the structure pivots, said second bearing having a fixed hoop on which is assembled a generator, a pump, a compressor or an element to be activated, thereby eliminating rotating links transmitting power, and a movable hoop, joined to the structure, on which is assembled a fixed or variable cylindered petrohydraulic servomotor for sending power to an axle of the generator, the pump, the compressor or the element to be activated; and a petrohydraulic plant situated on the rotor head which transforms mechanical energy of the rotor into petrohydraulic energy, wherein the petrohydraulic energy is transmitted through pressure pipes to the servomotor, thus forming a closed circuit.

5. A wind turbine comprising:

a support structure having a first end and a second end, said support structure being pivotally mounted, between the first end and the second end, to a column, the column having a substantially vertical axis;

a counterweight located adjacent the first end of said support structure;

a rotor head attached adjacent the second end of said support structure, said rotor head having a rotor with a center of gravity located on the substantially vertical axis of the column so as to reduce gyroscopic effects; and wherein the counterweight comprises a useable platform.

6. The wind turbine of claim 5 wherein said rotor head is tiltably attached to the second end of said support structure such that when said rotor head and the rotor and are required to tilt due to axial thrust, said rotor head tilts about said support structure, while said support structure remains stationary.

7. A wind turbine comprising:

a support structure having a first end and a second end, said support structure being pivotally mounted, between the first end and the second end, to a column, the column having a substantially vertical axis;

a counterweight located adjacent the first end of said support structure;

a rotor head attached adjacent the second end of said support structure, said rotor head having a rotor with a center of gravity located on the substantially vertical axis of the column so as to reduce gyroscopic effects; and wherein said support structure has an L-shaped configuration.

8. The wind turbine of claim 5 wherein the rotor comprises a self-stabilizing two-bladed rotor so as to improve self-guiding of the wind turbine whilst in action.

9. The wind turbine of claim 8 wherein the rotor is configured as a dihedral having an axial center of thrust situated behind, viewed in a direction of incidental wind, a center of gravity of the rotor, so as to give the rotor independent stability.

10. The wind turbine of claim 8 wherein an application point of axial thrust is situated behind, viewed in a direction of incidental wind, a rotation axis of the column so as to improve self-guiding of the wind turbine whilst the wind turbine is in action.

11. A wind turbine comprising:

a support structure having a first end and a second end, said support structure being pivotally mounted, between the first end and the second end, to a column, the column having a substantially vertical axis;

a counterweight located adjacent the first end of said support structure;

a rotor head attached adjacent the second end of said support structure, said rotor head having a rotor with a center of gravity located on the substantially vertical axis of the column so as to reduce gyroscopic effects;

wherein the rotor comprises a self-stabilizing two-bladed rotor so as to improve self-guiding of the wind turbine whilst in action; and a fork-bolt assembly supporting the rotor, the fork-bolt assembly being situated on an axis passing through the rotor's center of gravity, so as to allow the rotor to oscillate.

12. The wind turbine of claim 11 wherein the fork-bolt assembly includes a shock absorber for reducing pitching moments generated by the incidental wind when the incidental wind has low attack angles, when the incidental wind exhibits continuous direction changes or when the incidental wind encounters upper and lower blades of the rotor at different speeds.

13. The wind turbine of claim 11 wherein the rotor has a w-shape.

14. The wind turbine of claim 11:

further comprising a multiplier having internal elements and a chassis; and wherein axial thrust, pitching moments, and vibrations created by the rotor are transmitted through the fork-bolt assembly to the chassis of the multiplier such that the axial thrust, pitching moments, and vibrations are not transmitted through the internal components of the multiplier so as reduce wear of the internal components of the multiplier.

15. The wind turbine of claim 14 further comprising a bearing rotatably attaching the fork-bolt assembly to the chassis of the multiplier.

16. A wind turbine comprising:

a support structure having a first end and a second end, said support structure being pivotally mounted, between the first end and the second end, to a column, the column having a substantially vertical axis;

a counterweight located adjacent the first end of said support structure;

a rotor head attached adjacent the second end of said support structure, said rotor head having a rotor with a center of gravity located on the substantially vertical axis of the column so as to reduce gyroscopic effects;

wherein the column comprises a rotatable portion to which said support structure is pivotally mounted and a stationary portion;

a petrohydraulic plant situated on the rotor head which converts mechanical energy of the rotor into petrohydraulic energy;

a petrohydraulic servomotor attached to the rotatable portion of the column;

pressure pipes connecting the petrohydraulic plant with the servomotor, thus forming a closed circuit by which the petrohydraulic energy is transmitted from the petrohydraulic plant to the petrohydraulic servomotor;

an element to be activated attached to the stationary portion of the column; and wherein the petrohydraulic servomotor converts the petrohydraulic energy into mechanical energy, the mechanical energy being transmitted from the petrohydraulic servomotor to the element to be activated, thereby eliminating rotating links for transmitting power.

17. The wind turbine of claim 16 further comprising a bearing rotatably connecting the rotatable portion of the column and the fixed portion of the column.

18. The wind turbine of claim 16 wherein the element to be activated comprises a generator, a pump or a compressor.

* * * * *